3,350,172
PREPARATION OF TETRAFLUOROHYDRAZINE
FROM THE OXIDATION OF CARBAMATES
Vytautas Grakauskas, Arcadia, Calif., assignor to Aerojet-General Corporation, Azusa, Calif., a corporation of Ohio
No Drawing. Filed May 3, 1965, Ser. No. 452,883
10 Claims. (Cl. 23—205)

ABSTRACT OF THE DISCLOSURE

A process for producing tetrafluorohydrazine comprising reacting a liquid difluorocarbamate with an oxidizing agent selected from the group consisting of (1) compounds having the formula $P_yX_z$ in which P is a cation which includes a metal in an oxidation state ranging between +3 to +8 and selected from the group consisting of $Fe^{+3}$, $Cr^{+6}$, $Mn^{+7}$, $V^{+5}$, $As^{+5}$, $Sb^{+5}$, $W^{+6}$, $Mo^{+6}$, $Os^{+8}$, $Co^{+3}$, $Pt^{+4}$, $Ru^{+8}$, $Ir^{+6}$, and $Re^{+7}$; X is an anion, y and z are small whole numbers with the product of y times the positive oxidation state of P being equal to the product of z times the negative oxidation state of X, and (2) compounds in which an alkali metal cation is associated with a complex anion which contains from 3 to 4 atoms of oxygen in combination with an element in highly charged form, said anion being selected from the group consisting of permanganate, iodate, bromate, perchlorate, chromate, molybdate, vanadate, arsenate, and dichromate.

---

This invention relates to a process for preparing tetrafluorohydrazine. More specifically, this invention relates to a method for preparing tetrafluorohydrazine through the oxidation of an N,N-difluorocarbamate.

Previous processes for preparing tetrafluorohydrazine have required the isolation and use of the compound difluoroamine as a reactant. Since difluoroamine is an explosive and dangerous to work with, the preparation of tetrafluorohydrazine has been possible only on a very small scale using very great care in conducting the reaction.

An objection of the present invention is to provide a novel process for preparing tetrafluorohydrazine which does not require the use of explosive reactant materials. A further object of this invention is to provide a novel process for preparing tetrafluorohydrazine in which certain N,N-difluorocarbamates are oxidized with a selected oxidizing agent to form tetrafluorohydrazine.

The process of the present invention can be depicted by the following generalized reaction:

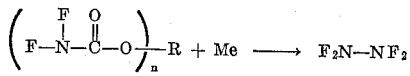

In the above reaction equation, Me represents either a metal or a halogen in a highly oxidized state. If a metal, the oxidization state of the metal ranges between plus 3 to plus 8. If a halogen, the oxidization state of the halogen is plus 5 or plus 7.

In the above formula for the carbamate reactant, R is a monovalent or polyvalent organic radical and n is an integer form 1 to about 10 and is preferably 1 or 2. The valency of R is normally equal to n. Preferred R groups include alkyl and haloalkyl radicals. Preferred divalent R groups include alkylene, and haloalkylene radicals. In general, R is a lower organic moiety and preferably contains from one to about six carbon atoms.

Illustrative carbamate compounds which can be employed in my process are ethyl N,N-difluorocarbamate, butyl, N,N-difluorocarbamate, hexyl N,N-difluorocarbamate, and 1,5-pentamethylenebis-(N,N-difluorocarbamate).

The carbamate compounds employed as reactants in my process and their method of preparation are fully described in my co-pending U.S. patent application, Ser. No. 404,210, filed on Oct. 14, 1964.

My process involves an oxidation-reduction reaction. The quantity of the oxidant employed (presented by Me in the above equation) should be adequate to oxidize all of the N,N-difluorocarbamate reactant and give the maximum yield of tetrafluorohydrazine. Stated more precisely, the product of the oxidant expressed in molar quantities times the change in the oxidation state of the oxidant Me during the course of the reaction is equal to the product of the number of moles of carbamate reactant times the number of —$NF_2$ groups in each molecule of the carbamate reactant. To illustrate, when the oxidizing agent is the ferric ion in the form of ferric ammonium sulfate the ferric ion is reduced to the ferrous ion during the course of the reaction. This represents a change in its oxidation state from plus 3 to plus 2. One molar quantity of the oxidant in this case can oxidize one molar quantity of a carbamate such as ethyl N,N difluorocarbamate, butyl N,N-difluorocarbamate, or hexyl N,N-difluorocarbamate in which each molecule of the carbamate reactant contains one —$NF_2$ group. Similarly, when the oxidizing agent is potassium perchlorate, in which the chlorine undergoes a change in oxidation state from +7 to −1 in the course of the reaction, one mole of oxidant will react with 8 moles of a carbamate reactant in which each molecule contains one —$NF_2$ group.

The quantity of oxidant employed, of course, will also be determined by the number of —$NF_2$ groups in each molecule of the carbamate reactant. Thus, for example, one mole of potassium perchlorate will react with only one mole of a carbamate reactant containing eight —$NF_2$ groups per molecule.

The oxidant required for my reaction and depicted by the notation Me in the above equation will fall into several different categories of compounds. The first category comprises compounds having the formula $P_yX_z$ in which P represents a simple or complex cation which includes a metal in an oxidation state ranging from +3 to +8, X represents a simple or complex anion, "y" and "z" are small whole numbers with the product of "y" times the positive oxidation state of P being equal to the product of "z" times the negative oxidation state of X. Illustrative examples of oxidant metals within this definition are $Fe^{+3}$, $Cr^{+6}$, $Mn^{+7}$, $V^{+5}$, $As^{+5}$, $Sb^{+5}$, $W^{+6}$, $Mo^{+6}$, $Os^{+8}$, $Co^{+3}$, $Pt^{+4}$, $Ru^{+8}$, $Ir^{+6}$, and $Re^{+7}$.

Examples of such oxidant compounds are vanadium pentachloride, ferric chloride, manganic bromide, chromic oxide, arsenic nitrate, cobaltic acetate, chromic formate, iridium bromide, ruthenium chloride, antimonic bromide, ferric oxide, ferric ammonium sulfate, and the like.

The term P, above, includes complex cations as, for example, in ferric ammonium sulfate which contains the ferric ion and the ammonium cation to balance the negative charge of the two sulfate anions. In this instance, the cation P can be viewed as $Fe^{+3}$ $(NH^4)^+$ having a plus charge of four. Likewise, the term X can include a complex anion, as in the case of the compound ferric hydroxy dichloride where the anion X can be viewed as hydroxy dichloride having a minus charge of three with the hydroxy radical having a minus charge of one and each chloride ion having a minus charge of one.

A further category of oxidants which may be employed in my process are complex anions which contain 3 or 4 atoms of oxygen in combination with an element in highly charged form. Examples of such anions are permanganate, iodate, bromate, perchlorate, chromate, molybdate, vanadate, arsenate, dichromate, and the like. In this instance the complex anion is generally associated with a simple cation such as, for example, an alkali metal cation such as sodium, potassium, lithium, and the like.

My process is carried out in the presence of a solvent. Since the oxidant material in my process is present as a salt, the solvent should be somewhat polar in nature such that the salt-like oxidant will have some solubility. A preferred solvent is water. Other solvents which may be employed are methanol, acetonitrile, propionitrile, acetone, methyl ethyl ketone, dioxane, tetrahydrofurane, and the like. The solvent should, of course, be essentially non-reactive with the oxidizing material and be at least a partial solvent for the carbamate reactant.

My process can be conducted over a wide range of temperatures, ranging from about $-30$ to about $+50°$ C. Preferably, the reaction is conducted within a range from about $0°$ C. to about $5°$ C. The only effect of temperature is to control the reaction rate with the reaction proceeding at higher rates as the temperature is increased. The reaction may, if desired, be conducted under pressure. However, the use of pressure does not give any advantages and I prefer to carry out the process at essentially atmospheric pressure. Although not critical, I prefer to employ some means of agitation to insure intimate contact of the reactants and an even reaction rate.

The product, tetrafluorohydrazine, is generally contaminated with carbon dioxide in the reaction product. The remainder of the reaction product is either solid or liquid and offers no problems to separation of product. Since tetrafluorohydrazine and carbon dioxide boil at approximately the same temperature, it is impractical to separate the two through distillation. Thus, I separate my product by passing the gaseous reaction products into aqueous or dry alkali such as potassium hydroxide, sodium hydroxide, and the like. The alkali scrubs out the carbon dioxide and leaves essentially pure tetrafluorohydrazine product.

The reduced oxidant material which is presented in the reaction product may in many cases be reoxidized and recycled as a reactant in the process. For example, $Cr^{+3}$, $Fe^{+2}$, $Mo^{+3}$, and the like, may be readily separated from the reaction product by, for example, decanting from the reaction mixture. Then, the metal may be reoxidized in any conventional manner, such as by roasting or through reaction with a peroxide.

It has been found that the pH of the reaction mixture is quite important in controlling the process. I employ a reaction medium having a pH of 7 or lower, i.e., either neutral or acidic. The reaction will go to some extent under alkaline conditions; however, side reactions then become more pronounced and the yield of product falls off.

To further illustrate my invention there are presented the following examples in which all parts and percentages are by weight unless otherwise indicated.

Example I

Two grams of chromium trioxide in t50 ml. of water were added at $5°$ C. over a period of 2-5 minutes to 5.6 grams of isopropyl N,N-difluorocarbamate. The gaseous products were taken off from the reaction mixture and fed to an Ascarite tower and from thence to an evacuated glass bulb where they were contained. The reaction took from 12-15 minutes and gave a quantitative yield of tetrafluorohydrazine having a purity of 98.7%. The purity of the product was determined by gas chromatographic and infrared comparison with an authentic sample of tetrafluorohydrazine.

When Example I is repeated, employing as the oxidant potassium perchlorate, potassium permanganate, or molybdenum hexachloride in place of the chromium trioxide, tetrafluorohydrazine is obtained in good yield.

Likewise, when Example I is repeated employing methanol, acetone, or tetrahydrofuran in place of the water, good yields of tetrafluorohydrazine are obtained.

Example II

Twenty grams of ferric ammonium sulfate dodecahydrate in 50 ml. of water were added to 5.6 grams of isopropyl N,N-difluorocarbamate at $5°$ C. over a period of 2 to 5 minutes. Reaction took place at temperatures between 25 to $27°$ C. over a period of about 60 minutes. The gaseous products were pulled from the reaction vessel and fed to an Ascarite tower and then to an evacuated glass bulb, as in Example I. There was obtained a quantitative yield of tetrafluorohydrazine of 99% purity as determined by gas chromatographic and infrared analysis.

Example III

To 0.1 mole of chromic oxide in water is added 0.1 mole of isopropyl N,N-difluorocarbamate. The gaseous products are fed to an Ascarite tower to remove carbon dioxide and there is obtained in good yield the product tetrafluorohydrazine.

When Example III is repeated employing as the reactants ferric ammonium sulfate and isopropyl N,N-difluorocarbamate, tetrafluorohydrazine is obtained in good yield.

Example IV

To 3 moles of potassium chromate in acetonitrile is added slowly one mole of n-butyl N,N-difluorocarbamate. The gaseous reaction products are pulled from the reaction mixture and fed to an Ascarite tower and from thence to an evacuated glass bulb to give tetrafluorohydrazine in good yield.

Example V

To one-sixth mole of sodium chlorate in acetonitrile is added one mole of ethyl N,N-difluorocarbamate. The gaseous products are fed to an Ascarite tower to remove carbon dioxide, and then to an evacuated glass bulb where the product tetrafluorohydrazine is obtained in good yield.

Example VI

To one-third mole of potassium permanganate in a 50–50 mixture of water and acetonitrile is added one mole of n-pentyl N,N-difluorocarbamate. The reaction products are fed to an Ascarite tower and from thence to an evacuated glass bulb where tetrafluorohydrazine is obtained in good yield.

Example VII

To 0.5 mole of ferric chloride in methanol is added 0.5 mole of isopropyl N,N-difluorocarbamate. The product tetrafluorohydrazine is obtained in good yield by passing the gaseous reaction products through an Ascarite tower.

Example VIII

To 2 moles of ferric chloride in water is added 1 mole of N,N,N',N'-tetrafluoroethyleneglycoldicarbamate. The gaseous reaction products are fed to an Ascarite tower to remove carbon dioxide and the product tetrafluorohydrazine is obtained in good yield.

As shown in the preceding examples, my process works well using a wide variety of oxidants and a wide variety of carbamate reactants to give tetrafluorohydrazine.

Having fully defined my invention, I desire to be limited only by the lawful scope of the appended claims.

I claim:

1. The process for preparing tetrafluorohydrazine comprising reacting a liquid carbamate compound having the formula

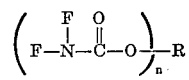

in which R is an organic radical, and $n$ is an integer from 1 to about 2 with an oxidizing agent selected from the group consisting of compounds having the formula $P_yX_z$ in which P is a cation which includes a metal in an oxidation state ranging between $+3$ to $+8$ and selected from the group consisting of $Fe^{+3}$, $Cr^{+6}$, $Mn^{+7}$, $V^{+5}$, $As^{+5}$, $Sb^{+5}$, $W^{+6}$, $Mo^{+6}$, $Os^{+8}$, $Co^{+3}$, $Pt^{+4}$, $Ru^{+8}$, $Ir^{+6}$, and $Re^{+7}$, X is an anion, and y and z are small whole numbers with the product of y times the positive oxidation state of P being equal to the product of z times the negative oxidation state of X, and compounds in which an alkali metal cation is associated with a complex anion which contains from 3 to 4 atoms of oxygen in combination with an element in highly charged form said anion being selected from the group consisting of permanganate, iodate, bromate, perchlorate, chromate, molybdate, vanadate, arsenate, and dichromate to yield tetrafluorohydrazine.

2. The process of claim 1 wherein the reaction is carried out in the presence of a polar solvent which is essentially non-reactive with the oxidant and is at least a partial solvent for the carbamate reactant.

3. The process of claim 2 wherein the reaction is conducted within a temperature range of about 0° to about 5° C.

4. The process of claim 2 wherein the reaction is carried out at a pH up to and including 7.

5. The process for preparing tetrafluorohydrazine comprising reacting a liquid carbamate compound having the formula

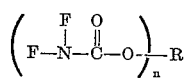

in which R is selected from the group consisting of alkyl, haloalkyl, alkylene, and haloalkylene radicals, and n is an integer from 1 to 2 with the valence of R being equal to n, with an oxidizing agent having the formula $P_yX_z$ in which P is a cation containing a metal in an oxidation state ranging between +3 to +8 selected from the group consisting of $Fe^{+3}$, $Cr^{+6}$, $Mn^{+7}$, $V^{+5}$, $As^{+5}$, $Sb^{+5}$, $W^{+6}$, $Mo^{+6}$, $Os^{+8}$, $Co^{+3}$, $Pt^{+4}$, $Ru^{+8}$, $Ir^{+6}$, and $Re^{+7}$, X is an anion, and y and z are small whole numbers with the product of y times the positive oxidation state of P being equal to the product of z times the negative oxidation state of X, said process being carried out in the presence of a polar solvent which is essentially non-reactive with the oxidant and is at least a partial solvent for the carbamate reactant, said process being carried out at a pH up to and including 7.

6. The process of claim 5 wherein the process is conducted at a reaction temperature within the range of about 0 to 5° C.

7. The process of claim 5 wherein the oxidant contains $Fe^{+3}$.

8. The process of claim 5 wherein the oxidant contains $Cr^{+6}$.

9. The process for preparing tetrafluorohydrazine comprising reacting a liquid carbamate compound having the formula

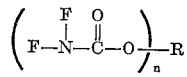

in which R is selected from the group consisting of alkyl, haloalkyl, alkylene, and haloalkylene radicals, and n is an integer from 1 to 2 with the valence of R being equal to n, with an oxidizing agent which is an alkali metal salt of a complex anion containing from 3 to 4 atoms of oxygen in combination with an element in highly charged form, said anion being selected from the group consisting of permanganate, iodate, bromate, perchlorate, chromate, molybdate, vanadate, arsenate, and dichromate, said process being carried in the presence of a polar solvent which is essentially non-reactive with the oxidant and is at least a partial solvent for the carbamate reactant with the reaction medium having a pH up to and including 7.

10. The process of claim 9 wherein the reaction is conducted at a reaction temperature ranging from about 0 to about 5° C.

References Cited
UNITED STATES PATENTS

| | | | |
|---|---|---|---|
| 3,220,799 | 11/1965 | Colburn | 23—205 |
| 3,220,800 | 11/1965 | Martin | 23—205 |
| 3,254,944 | 6/1966 | Lawton et al. | 23—205 |

OSCAR R. VERTIZ, *Primary Examiner.*

G. T. OZAKI, *Assistant Examiner.*